United States Patent

D'Auria

[11] Patent Number: 5,988,224
[45] Date of Patent: Nov. 23, 1999

[54] MODULAR SLEEVE FOR PROTECTING, REPAIRING OR RENOVATING A PIPE

[75] Inventor: Stanislas Boulet D'Auria, Cap D'Ail, France

[73] Assignee: 3X Engineering, Monaco, Monaco

[21] Appl. No.: 09/051,773

[22] PCT Filed: Oct. 18, 1996

[86] PCT No.: PCT/FR96/01637

§ 371 Date: Apr. 20, 1998

§ 102(e) Date: Apr. 20, 1998

[87] PCT Pub. No.: WO97/14909

PCT Pub. Date: Apr. 24, 1997

[30] Foreign Application Priority Data

Oct. 18, 1995 [FR] France ..................... 9512471

[51] Int. Cl.[6] .............. F16L 55/16; F16L 11/12
[52] U.S. Cl. ............................ 138/99; 285/45
[58] Field of Search ................ 138/99; 425/117, 425/577; 525/457; 264/466; 439/572; 285/45

[56] References Cited

U.S. PATENT DOCUMENTS

| | | |
|---|---|---|
| 1,510,483 | 10/1924 | Lang . |
| 1,698,967 | 1/1929 | Reading . |
| 4,073,841 | 2/1978 | Dultgen et al. ............... 264/46.6 |
| 4,585,091 | 4/1986 | Budd .............................. 138/99 |
| 4,607,866 | 8/1986 | Erlichman ....................... 138/99 |
| 4,752,208 | 6/1988 | Iwata et al. .................... 425/577 |
| 5,115,048 | 5/1992 | Maeda et al. .................. 525/457 |

FOREIGN PATENT DOCUMENTS

| | | |
|---|---|---|
| 0 653 293 A1 | 5/1995 | European Pat. Off. . |
| 2 119 884 | 11/1983 | United Kingdom . |
| 2 121 708 | 1/1984 | United Kingdom . |

*Primary Examiner*—Andres Kashnikow
*Assistant Examiner*—Davis Hwu
*Attorney, Agent, or Firm*—Lydon & Brown, LLP

[57] ABSTRACT

A sleeve (10) for use as a mould for protecting, repairing or renovating a pipe (12) for carrying water, gas or other fluids. A liquid material such as polyurethane or epoxy resin is injected into the sleeve so that, as it polymerizes, it protects or seals the pipe section covered by the sleeve. The sleeve includes a plurality of identical modules (14, 16, 18, 20, 22) assembled to form the mould and each including a male portion and a female portion linked by an intermediate portion. The male portion of one module is designed to fit into the female portion of the adjacent module.

8 Claims, 3 Drawing Sheets

MODULAR SLEEVE FOR PROTECTING, REPAIRING OR RENOVATING A PIPE

TECHNICAL FIELD

The present invention relates to protection, repair and renovation of pipes used for carrying water, gas or other fluids, and particularly to a modular sleeve wherein a polymerizable material is injected.

PRIOR ART

Using a sleeve as an injection mould is needed, either to protect the coupling between two pipes, or to seal off a leak in a pipe. The portion to be protected or repaired is surrounded with the sleeve that forms a tight cavity wherein is injected a polymerizable liquid material that, when polymerizing, forms a leak sealing or thermal and chemical insulation, anti-shock coating.

Sleeves used in prior art, as set forth for example in patents FR 2.158.895, EP 278.050, U.S. Pat. No. 4,610,740 or GB 2.119.884, are composed of two cylindrical half-shells linked to form only one shell that covers the pipe portion to be protected or repaired. Then, the polymerizable liquid material (generally made up of epoxy or polyurethane resin components) is poured through an injection hole provided for in the shell wall into the cavity thus formed.

These sleeves composed of two half-shells are thus suitable for a pipe having a given diameter. Therefore, it is necessary to have sleeves with various diameters capable of fitting the various pipe diameters. That way, various moulds are required to manufacture half-shells with diameters matching all pipe diameters, what leads to a prohibitive cost.

SUMMARY OF THE INVENTION

This is why the object of the invention is to provide a sleeve made up of identical modules requiring only one module manufacturing mould, such a sleeve being capable of fitting pipes having various diameters through the use of the proper number of sleeve modules.

The invention relates therefore to a sleeve meant for protecting, repairing or renovating a pipe carrying water, gas or other fluids, forming an injection mould surrounding the pipe portion to be protected or repaired, wherein are injected the components of a liquid polymerizable material that, when polymerizing, provides protection or sealing of the covered pipe portion, said sleeve being made up of a plurality of modules each comprising male, female, and intermediate parts, the male part of a module being designed to fit partially or totally into the female part of the adjacent module so as to adjust the sleeve to said pipe whose diameter is located within a given range.

BRIEF DESCRIPTION OF THE DRAWINGS

The objects, features and other characteristics of the invention will become more apparent from the following detailed description with reference to the accompanying drawings, in which.

DETAILED DESCRIPTION OF THE INVENTION

Figure 1:
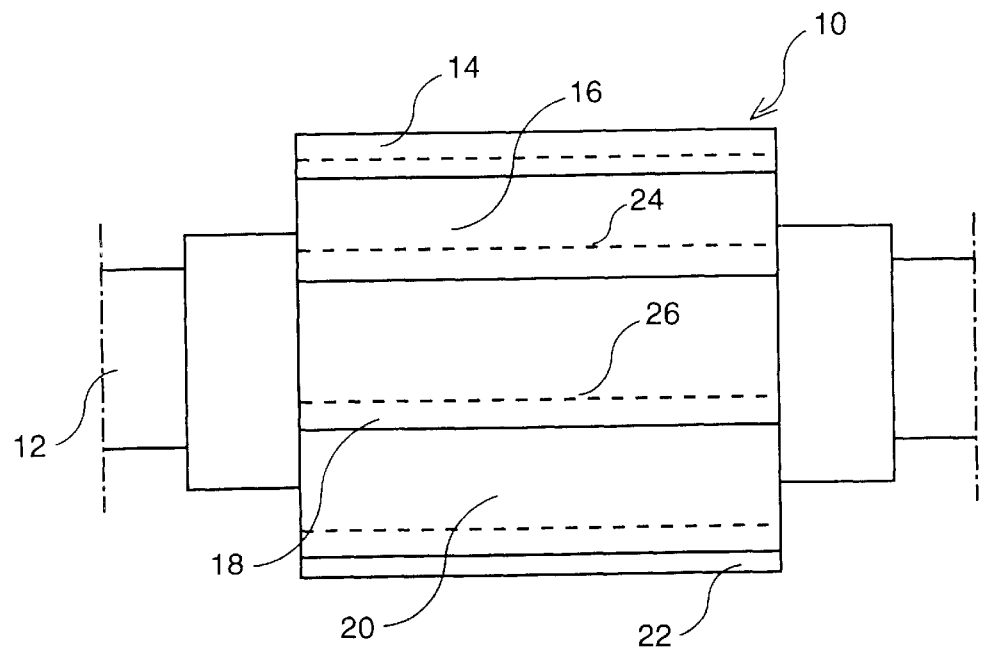
FIG. 1 shows in broad outline a modular sleeve covering a pipe portion to be protected or repaired.

FIG. 1 shows in broad outline a sleeve 10 covering a portion of a pipe 12 that requires either to be protected (coupling between two pipe ends), or to be repaired (leak).

The sleeve 10 shown on FIG. 1 is made of plastic and is composed of a plurality of identical modules such as modules 14, 16, 18, 20, and 22. A part of each module is fitted into its adjacent module. This way, the module 18 has a part shown as the dotted line 24 fitted into the module 16, the module 20 has a part shown as the dotted line 26 fitted into the module 18, etc.

Figure 2:
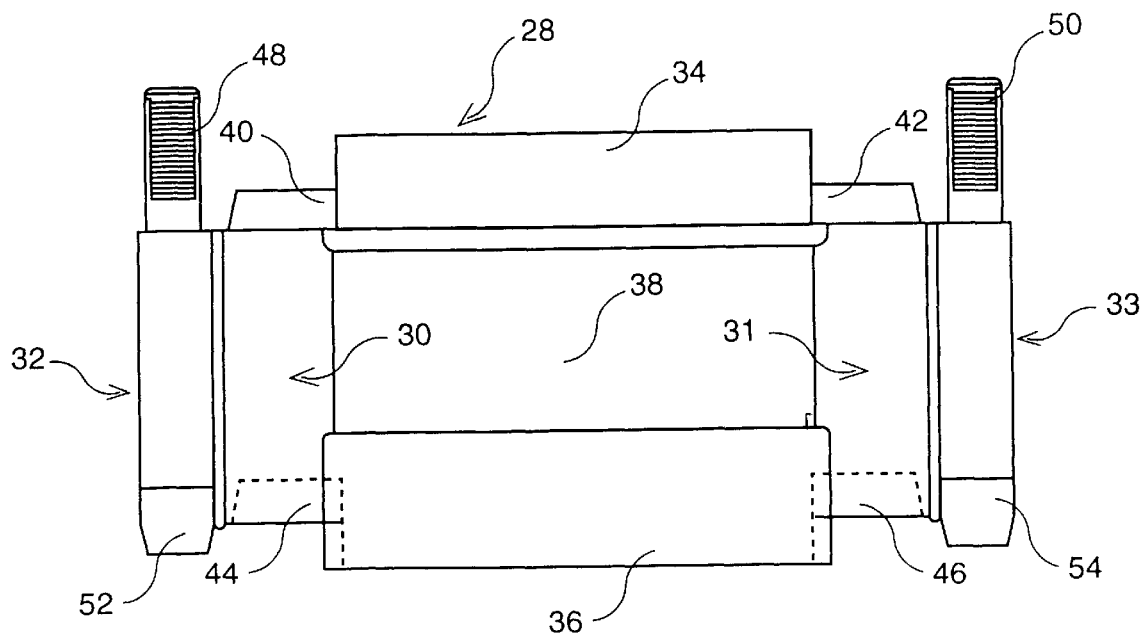
FIG. 2 is a top view of a sleeve module according to a preferred embodiment of the invention.
Figure 3:
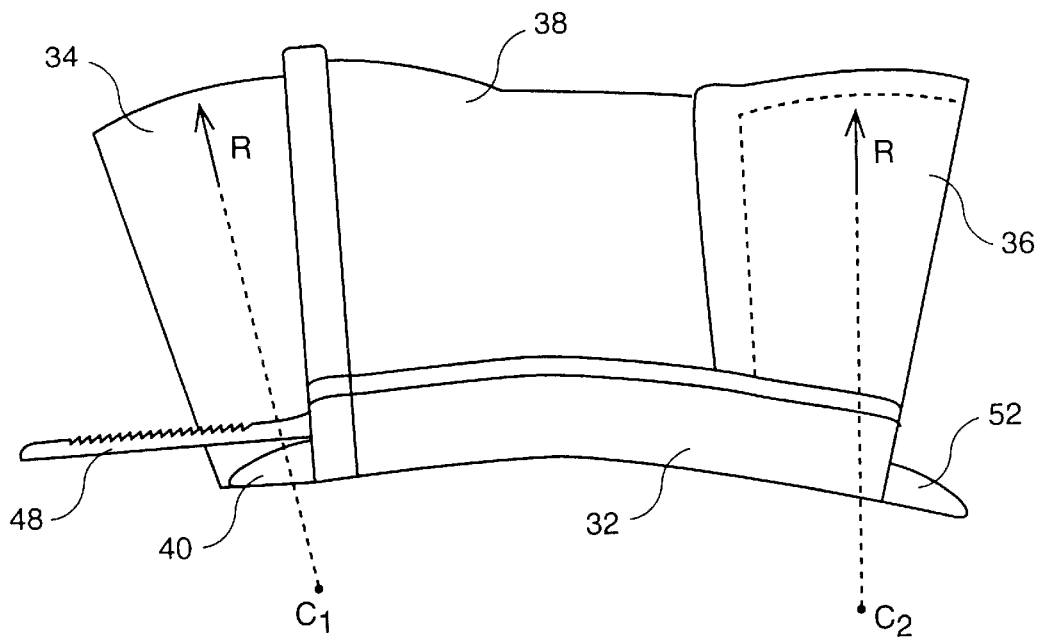
FIG. 3 is a side view, with partial cross-sectional view, of a sleeve module according to a preferred embodiment of the invention.

The following description relates to the structure of each module shown in top view on FIG. 2 and in side view on FIG. 3.

Each module that makes up the sleeve comprises a central portion 28 that forms a part of the mould wherein the polymerizable material is injected, two symmetrical tightening portions 30 and 31 on both sides of the central portion, and two symmetrical fastening portions 32 and 33 on both sides of the tightening portions.

The central portion 28 is composed of three parts, one male part 34, one female part 36, and one intermediate part 38. As shown on FIG. 3, the outer surface of the male part 34 has the shape of an arc of a circle having a radius R and a centre C1 located lower than the module. The inner surface of the female part has also the shape of an arc of a circle having a radius R and a centre C2 located lower than the module. Since the outer radius of the male part is equal to the inner radius of the female part, the male part of each module can fit easily into the female part of the adjacent module.

Each of the tightening portions 30 and 31 located on both sides of the central part comprises a tab 40 or 42 having the shape of a right-angled triangle with a convex hypotenuse (see FIG. 3), located on the same side as the male part 34 of the module central portion, and an opening 44 or 46 whose shape is complementary to the shape of the tabs, located on the same side as the female part of the central portion. This way, when the male part of a first module is fitted into the female part of a second adjacent module, the tabs 40 and 42 of the first module are also fitted respectively into the openings 44 and 46 of the second module.

The two fastening portions 32 and 33 are located on each side of the tightening modules. Each fastening portion comprises a tongue 48 or 50, notched on its upper surface and located on the same side as the male part of the module central portion, and a tab 52 or 54 having the shape of a right-angled triangle with a convex hypotenuse.

Figure 4:
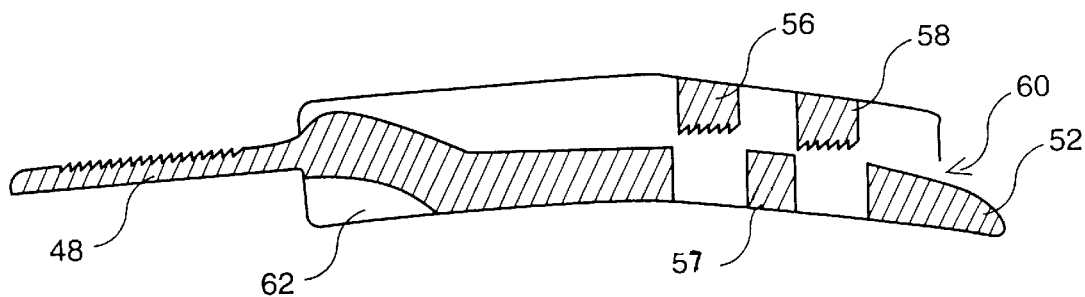
FIG. 4 shows in broad outline the cross-sectional view of a fastening portion located on both sides of the module.

As it can be seen on FIG. 4 that shows the fastening portion 32 in cross-sectional view, the inside of this portion comprises portions 56 and 58, notched on their lower surface that is complementary to the notched upper surface of the tongue 48. That way, when the first module is fitted into a second adjacent module, the tongue 48 can be inserted into the tightening portion 32 of the second module through the opening located on the side opposite to the tongue, and passing just above the tab 52. As the first module fits into the second one, the notches of tongue 48 of the first module gear with the notches of the notched portions 56 and 58, the tongue being held by the non notched portion 57. The notches of the tongue 48 and the complementary notches of portions 56 and 58 have a serrated shape so that the tongue cannot move back when its notches are in gear with those of portions 56 and 58. Therefore, we get a "non-return" effect when fastening modules to each other.

However, the modules may be poorly fitted and may required to be disassembled to have them properly fitted next. Therefore, it is preferred to provide for the possibility of disassembling the modules. To this end, the portion 57 (see FIG. 4) located opposite the notched portions 56 and 58, can be designed to be a movable part so that the notched tongue can be disengaged from the notched portions 56 and 58, and remove completely said tongue.

The fastening portion also comprises an opening whose shape is similar and complementary to the one of the tab 52 and located under the tongue 48 so that, when fitting a first module into a second one, the tab 52 of the second module get into the opening 62 of the first module at the same time as the tongue 48 of the first module gets into the fastening portion 32 of the second module.

Figure 5:
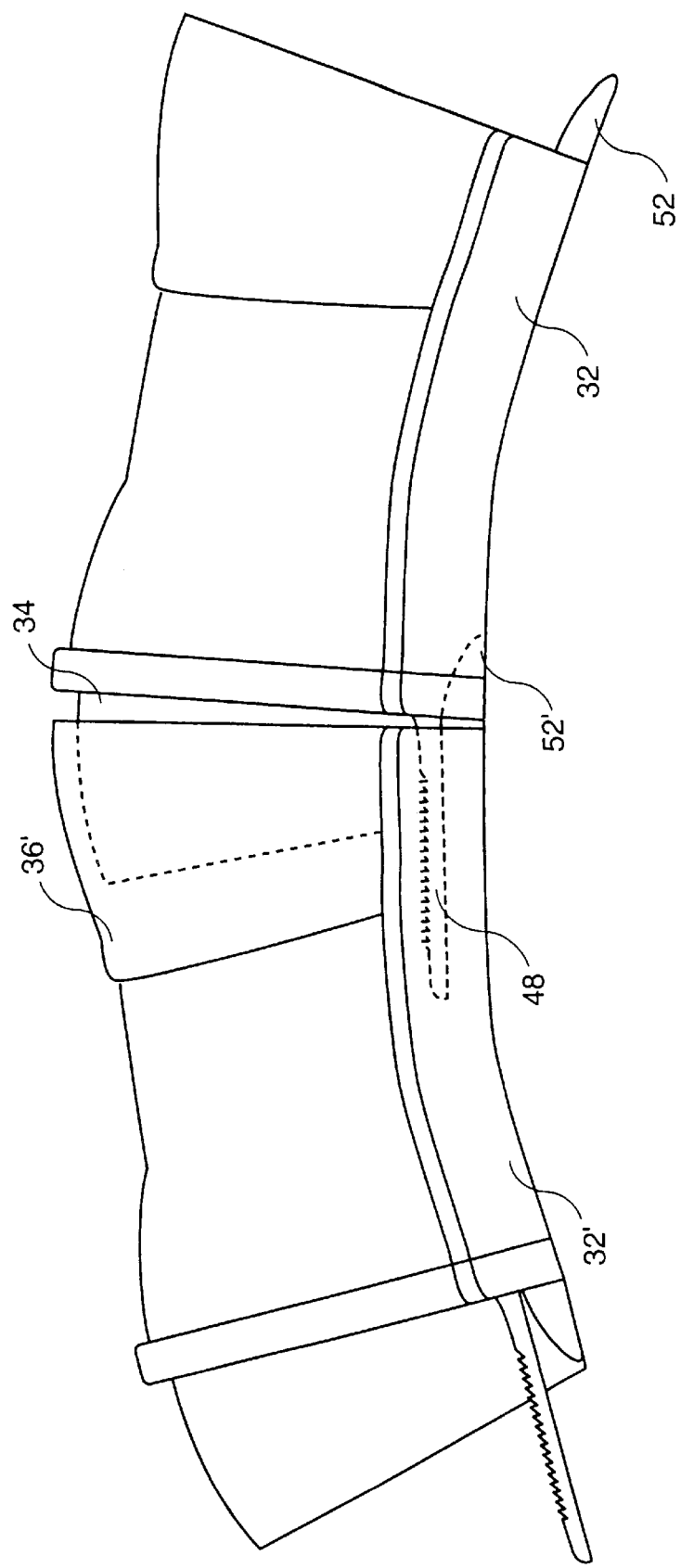
FIG. 5 shows in broad outline two modules fitted together to make up a sleeve according to the invention.

Finally, setting up the modular sleeve is carried out by fitting each module into the module adjacent to it as shown on FIG. 5. The male part 34 of a first module is fitted into the female part 36 of a second adjacent module. At the same time, the notched tongue 48 (or 50) of the first module fastening portion is inserted inside the fastening portion 32I of the second module. The tabs (40 and 42) of the first module tightening portions get into the complementary opening (not shown) of the second module tightening portions, and the tabs 52' (or 54') of the second module get into the openings 44 (or 46) of the first module.

Although it is not shown on the figures, a foam layer is stuck on the inner surface of tightening and/or fastening portions of each module so as to provide a good tightness when the sleeve is in place. But this layer can also be inserted between the modules and the pipe when the sleeve is being set up.

It must be noted that the tightness of the cavity formed by the central portion of the sleeve made up by the interlocking of male portions into female portions comes normally from the fact that the outer radius R of each male part is equal to the inner radius of each female part. However, in order to provide a perfect tightness, it is possible to provide for a tightness seal on the outer edge of the male part that gets first into the female part of the adjacent module.

The number of modules used depends on the diameter of the pipe to be protected or repaired. However, in most cases, the male part 34 does not get fully into the female part 36', as shown on FIG. 5. It is the same for the notched tongue 48 that gets only partly inside the fastening portion 32'.

As the modules are fitted into each other, the anti-return or fastening effect is reached thanks to the penetration of notched tongues into fastening portions, which prevents the modules from being disconnected once fitted. Besides, it is useful to provide for a tool having two branches meant for grasping the fastening portions and produce a tightening force on said portions so as to get a perfect fastening.

When the modules are tightly gripped around the pipe, the sleeve is locked by means of two straps (not shown) arranged around the tightening portions of the modules. This tightening is required to get a perfect tightness thanks to the foam layer arranged between the pipe and the fastening portions.

It is to be noted that, in order to match a wide range of pipe diameters, the shape of the lower profile of each module cannot be circular. As shown on FIG. 3, this profile is made up of two straight parts linked by a part having the shape of an arc of a circle. This way, whatever the number of modules used to make up the sleeve, there is no "break" or knuckle point between the modules. In most cases, the inner surface of each module is practically in line with the inner surface of the adjacent module, as shown on FIG. 5. However, it is to be noted that, since the lower profile of the modules cannot follow closely the outer surface of the pipe, the gap between the two surfaces is balanced by the crushing, more or less intense depending on the location, of the foam placed between the surfaces and meant for providing a good tightness.

The modular sleeve set forth above has the advantage of being capable of making up sleeves fitted to various pipe diameters by means of identical modules, except one module that comprises a hole to inject the polymerizable material. Therefore, only one mould is required to manufacture all the modules. This way, with a module whose central portion 32 has a base of 80 mm, it is possible to make up sleeves fitted to various pipe diameters by using a number of modules defined as follow:

| Pipe diameter | Number of modules |
| --- | --- |
| 300 MM | 12 |
| 350 MM | 14 |
| 400 MM | 16 |
| 450 MM | 18 |
| 500 MM | 20 |
| 600 MM | 24 |

Thus, a given number of modules will match pipe diameters ranging from a minimum value to a maximum value. For example, 16 modules will be used to fit pipe diameters ranging from 385 MM to 415 MM. This capacity, for a given number of modules, to fit a plurality of pipe diameters is achieved thanks to the interlocking, that can vary within a certain range, of a plurality of pipe diameters is obtained thanks to the interlocking, that can vary within a certain range, of the male part of a module into the female part of the adjacent module, as seen above, and thanks to the compression, that can also vary, of the foam layer located under the tightening portions of the modules.

I claim:

1. A sleeve for protecting, repairing or renovating a pipe carrying water, gas or other fluids, said sleeve forming a mould for surrounding the pipe portion to be protected or repaired, wherein is injected a liquid material such as polyurethane resin that, when polymerizing, provides the protection or the sealing of the pipe portion covered by the sleeve, said sleeve being characterized in that it is composed of a plurality of identical modules whose assembling makes up said mould, each comprising a male part and a female part linked by an intermediate part, the male part of a module being designed to fit partially or fully into the female part of the adjacent module so as to fit the sleeve to said pipe whose diameter is located within a given range.

2. The sleeve according to claim 1, wherein said male parts, female parts, and intermediate parts have a cylindrical shape in the longitudinal direction of the pipe, the cross-section outer profile of said male part having the shape of an arc of a circle with radius R and the cross-section inner profile of said female part having the shape of an arc of a circle also with radius R so that the male part of each of the modules that make up the sleeve fit perfectly by rotation into the female part of the adjacent module.

3. The sleeve according to claim 1, wherein the inner profiled of each of said modules is made up of two straight parts linked by an arc of a circle so that the inner surface of a module be substantially in line with the inner surface of the adjacent module when the modules are fitted into each other to make up the sleeve.

4. The sleeve according to claim 1, wherein each of said modules moreover comprises two symmetrical fastening means located on both sides of the module portion used as a mould, said fastening means being used as anti-return means for preventing modules from being disassembled as said male parts are fitted into said female parts.

5. The sleeve according to claim 4, wherein each of said fastening means comprises a notched tongue and at least an inner notched portion designed to gear with said notched tongue, arranged so that, when fitting the male part of a first module into the female part of a second module, the notched tongue of the first module get into the fastening means of the second module and gear with the notched portion of the latter so as to provide an anti-return effect.

6. The sleeve according to claim 4, wherein each of said modules comprises besides two symmetrical fastening means each located between the module portion used as a mould and one of said fastening means meant for tightening said sleeve around the pipe when said modules are assembled.

7. The sleeve according to claim 6, wherein said fastening means of each of said modules comprise a tightening portion designed to fit into the tightening portion of the adjacent module when the modules are being assembled, the tightening being provided by means of straps surrounding the tightening portions of modules after they are assembled.

8. The sleeve according to claim 7, wherein a foam layer is arranged between the pipe and said tightening portions with the aim of providing a good tightness of the sleeve when the polymerizable liquid material is injected, said foam being compressed when tightening is carried out by means of said straps.

* * * * *